(12) United States Patent
Urlwin-Smith

(10) Patent No.: US 6,192,986 B1
(45) Date of Patent: Feb. 27, 2001

(54) BLOCKING COMPOSITION FOR USE IN SUBTERRANEAN FORMATION

(75) Inventor: Phillip Lance Urlwin-Smith, Ascot (GB)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/242,552

(22) PCT Filed: Sep. 17, 1997

(86) PCT No.: PCT/GB97/02508

§ 371 Date: Feb. 18, 1999

§ 102(e) Date: Feb. 18, 1999

(87) PCT Pub. No.: WO98/12415

PCT Pub. Date: Mar. 26, 1998

(30) Foreign Application Priority Data

Sep. 18, 1996 (GB) .................................................. 9619418

(51) Int. Cl.⁷ .................................................... E21B 33/00
(52) U.S. Cl. ......................................... 166/295; 166/305.1
(58) Field of Search ................................... 507/224, 225, 507/239; 166/294, 295, 300, 305.1

(56) References Cited

U.S. PATENT DOCUMENTS

| 4,757,862 | * | 7/1988 | Naiman et al. | 166/295 |
| 4,776,398 | * | 10/1988 | Chu et al. | 166/403 |
| 4,909,324 | * | 3/1990 | Shu | 166/275 |
| 5,003,006 | * | 3/1991 | Chu et al. | 522/92 |
| 5,346,013 | * | 9/1994 | Pusch et al. | 166/295 |
| 5,836,392 | * | 11/1998 | Urlwin-Smith | 166/295 |

FOREIGN PATENT DOCUMENTS

| 0 005 835 | * | 12/1979 | (EP) . |
| 07 011 211 | * | 1/1995 | (JP) . |

\* cited by examiner

Primary Examiner—David Bagnell
Assistant Examiner—Jennifer R. Dougherty
(74) Attorney, Agent, or Firm—Robert A. Kent

(57) ABSTRACT

A polymer composition for pumping downhole to gel in a subterranean formation comprises a water-soluble copolymer of (i) at least one non-acidic ethylenically unsaturated polar monomer and (ii) at least one copolymerisable ethylenically unsaturated ester; and an organic gelling agent therefor.

19 Claims, 2 Drawing Sheets

BLOCKING COMPOSITION FOR USE IN SUBTERRANEAN FORMATION

BACKGROUND OF THE INVENTION

1. Field of the Invention

The present invention relates to polymeric compositions and their use for blocking subterranean formations in oil and gas fields.

2. Discussion of Realted Art

Oil and gas fields produce water as well as oil and/or gas, especially when the well is depleted. In addition. secondary recovery techniques such as water flooding to stimulate production of oil involve injection of water under pressure at a distance from a production well to squeeze the oil out. However, in both cases the water moves in the formation along least hindered paths, so that the recovery technique may be inefficient, and in the direct recovery increased proportions of water are produced.

To enhance reservoir conformance control, i.e. to mobilise the oil that may be present in less permeable areas, blocking agents may be injected to obstruct the high permeability channels thereby encouraging preference for liquid movement via the lower permeability channels. Among known blocking agents are polymer gels, in particular gels of polyacrylic acid or polyacrylamide/polyacrylic copolymers, cross-linked with chromium ions as disclosed, for example, in U.S. Pat. Nos. 4,744,418 and 4,844,168. The copolymer, mixed with cross-linker, is injected into the formation from the production well, often after a flood of cold water to pre-cool the formation rock, to stop premature cross-linking and gelling before the mixture reaches its desired position. Much work has been described to reduce the rate of cross-linking, by reducing the activity of the cross-linking metal ion, e.g. by co-ordinating the chromium with a ligand, e.g. lactate. Other cross-linking agents which have been used are metals such as zirconium and other transition metals.

Whilst the use of metal cross-linking agents is reasonably satisfactory in practice, there are certain disadvantages. For example, there can be environmental effects with the use of metal ions, particularly with chromium. For some rocks, such as carbonate rocks, the metals used as cross-linking agents are absorbed by the rocks and are hydraulically unstable at temperatures above 70° C. and so cannot function properly, thus reducing the effectiveness of the blocking polymers.

U.S. Pat. No. 4,773,481 describes a process for reducing the permeability of a subterranean formation by the gelation of water-soluble polymers of polyalkyleneimines and polyalkylenepolyamines with certain polymeis which are anionic or hydrolysable to form anionic polymers and which are cross-linked by the water-soluble polymers. Examples of the anionic or non-ionic polymers are polyacrylamide and alkylpolvacrylamides, copolymers of polyacrylamide and alkylpolyacrylamides with ethylene, propylene and styrene, polymaleic anhydride and polymethacrylate and hydrolysis products thereof. As described in the patent, when the water-soluble polymer and the anionic polymer are mixed, a viscous gel is quickly formed. In use, a solution of the water-soluble polymer is pumped into the subterranean formation first, followed by water to cleanse the bore of the water-soluble polymer to prevent premature gelling upon introduction of the anionic polymer. and finally the anionic polymer is introduced.

This three step procedure has a number of disadvantages in practice but it is necessary because the water-soluble polyalkyleneimine or polyalkylenepolyamine reacts very quickly with the anionic polymer and hence cannot be premixed before injection without substantial risk of premature gelation. To some extent, this problem can be reduced by using a non-ionic polymer which is hydrolysable to an anionic polymer at a relatively slow rate, but this limits the choice of materials and is not generally satisfactory. So far as we are aware, the process of U.S. Pat. No. 4,773,481 has either not been commercially utilised, or has only been used to a small extent, presumably because of the substantial practical difficulties involved.

SUMMARY OF THE INVENTION

We have now found a way of avoiding the use of metal ion cross-linking agents and of controlling the gelling rate of polymers whereby premixes of polymer and gelling agent can be made and safely injected into a downhole formation without serious risk of premature gelation.

In one aspect, the invention provides a composition for use in a subterranean formation, which composition comprises a water-soluble copolymer comprising (i) at least one non-acidic ethylenically unsaturated polar monomer and (ii) at least one copolymerisable ethylenically unsaturated ester;

and at least one organic gelling agent, characterized in that the organic gelling agent is a polyalkyleneimine, polyfunctional aliphatic amine, an aralkylamine or a heteroaralkylamine.

The organic gelling agents are free from metal ions, and are preferably water-soluble polymers capable of cross-linking the copolymers. Among the preferred water-soluble polymers for use as gelling agents are polyalkyleneimines, polyalkylenepolyamines and mixtures thereof. Additional details concerning these polymers and their preparation are disclosed in U.S. Pat. No. 3,491,049. The preferred polyalkylenepolyamines are the polymeric condensates of lower molecular weight polyalkvlenepolyamines and a vicinal dihaloalkane. The polyalkyleneimines are best illustrated by polymerized ethyleneimines or propyleneimine. The polyalkylenepolyamines are exemplified by polyethylene and polypropylenepolyamines.

Other gelling agents which can be used include water-soluble polyfunctional aliphatic amines, aralkylamines and heteroaralkylamines optionally containing other hetero atoms.

In a second aspect. the invention provides a method of conformance control of a subterranean reservoir, which comprises:

(a) injecting into a formation an aqueous solution of a composition of the invention;

(b) allowing the solution to flow through at least one permeable zone in said formation; and (c) allowing the composition to gel.

In the method of the invention. it is generally unnecessary to have any pre-cool step, especially in wells with bottom hole temperatures up to about 120° C. As the solution is pumped downhole and permeates into the zone, it heats up and eventually reaches the downhole temperature after which gelling occurs. The permeability of the zone is preferably high but it can be down to about 60 mD.

DETAILED DESCRIPTION OF THE INVENTION

Figure 1:
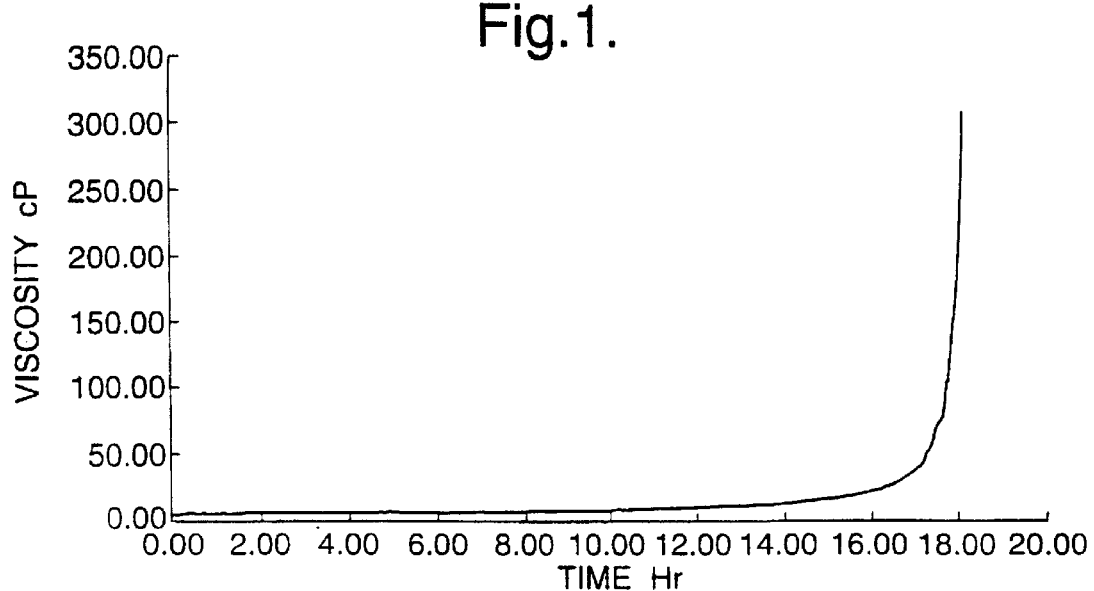
FIG. 1 is a graphical plot of viscosity versus time for a composition of the present invention.
Figure 2:
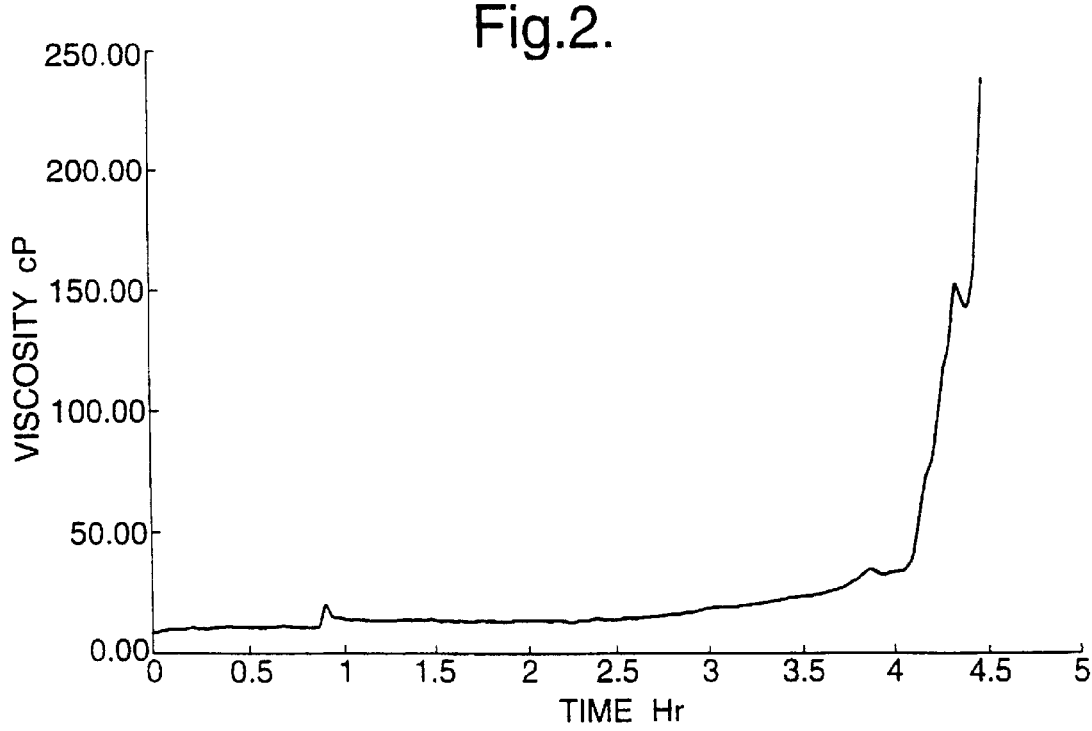
FIG. 2 is a graphical plot of viscosity versus time for a composition of the present invention.
Figure 3:
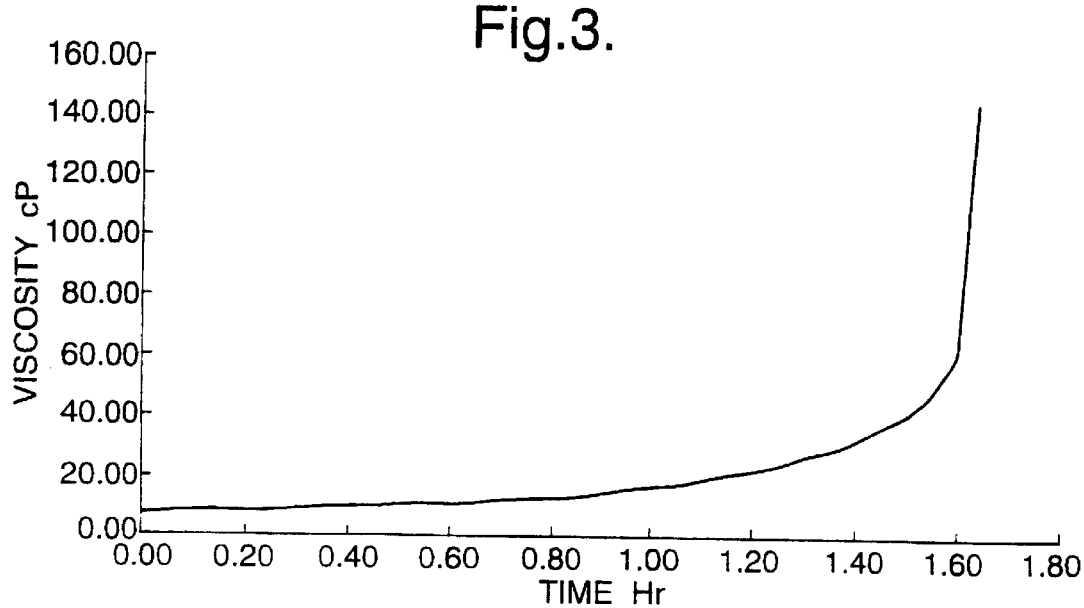
FIG. 3 is a graphical plot of viscosity versus time for comparison utilizing known compositions.
Figure 4:
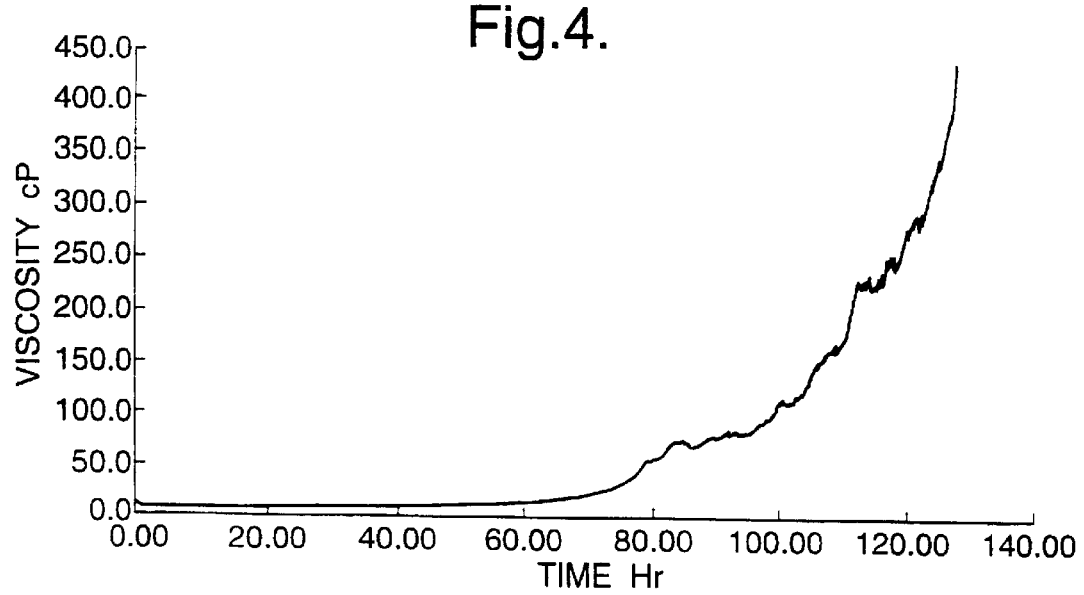
FIG. 4 is a graphical plot of viscosity versus time for comparison utilizing known compositions.

In the composition of the invention, the copolymer is formed from at least one polar monomer, preferably from 1 to 3 monomers, and at least one, preferably from 1 to 3, esters, and comprises structural units derived from said monomer(s) and ester(s). Most preferably, the copolymer consists essentially of said structural units. The ester is preferably substantially neutral as a fully esterified derivative of an acid, i.e. complete ester, rather than a partial ester with free acid groups.

The presence of the ester moiety in copolymers of the invention is vital since it delays the gelling reaction and thus enables the copolymer to be premixed with gelling agent before being pumped downhole. We prefer that the ester group be such as to provide steric hindrance and, for this purpose, bulky ester groups such as t-butyl, for example, are preferred. The precise delay in cross-linking and gelation caused by the ester group will vary from copolymer to copolymer, as will be clear to those skilled in the art. Some experimental trial may, therefore, be necessary to determine the optimum with any particular copolymer. The nature and amount of the ester will be such as to provide a delay in the gelation (compared to a homopolymer omitting any ester component), sufficient for example to enable a premix to be pumped into a formation without premature gelling.

The ethylenically unsaturated esters used in the copolymers are usually formed from a hydroxyl compound and an ethylenically unsaturated carboxylic acid. The ethylenically unsaturated group is preferably in the alpha-beta or beta-gamma position relative to the carboxyl group, but it may be further distant. Preferred acids have 3–20 carbon atoms e.g. 3 to 12 and include. for example. alkenoic and aralkenoic acids with 3 to 6 or 9 to 12 carbon atoms, respectively. Examples of these acids are acrylic, methacrylic. crotonic and cinnamic acids. The hydroxyl compound is usually an alcohol and may be of formula ROH. where R is a hydrocarbyl group. Preferred hydrocarbyl groups are alkyl groups of 1 to 30 or 2 to 30 such as 1 to 6, 2 to 6, 7 to 30 or 7 to 24 carbon atoms; alkenyl groups of 2 to 20 carbon atoms such as 2 to 6 carbon atoms; cycloalkyl groups of 5 to 8 carbons; aryl groups such as aromatic hydrocarbyl groups having 6 to 20 carbon atoms. and aralkyl groups of 7 to 24 carbon atoms. Specific examples of R groups are methyl, ethyl, propyl, butyl, amyl, hexyl, octyl, 2-ethylhexyl and decyl (including all stereoisomers), allyl, cyclohexyl, palmityl, stearyl, phenyl and benzyl. The R group may also be a hydrocarbyl group substituted by at least one, e.g. 1 to 3 substituents, especially hydroxyl, ether, and thio ether groups. Electron donating group substituents are preferred. Ether substituents are preferred, especially alkoxy, aryloxy and aralkoxy, in which the alkyl, aryl and aralkyl groups may be as described above. Preferably, the substituent is on the same carbon atom of the R group as is bonded to the hydroxyl group in the hydroxyl compound; alkoxymethyl and aralkoxy methyl groups are preferred. The hydroxyl compound may be a primary, secondary, iso or tertiary compound, especially with a tertiary carbon atom bonded to the hydroxyl group, e.g. tert-butyl and trityl. The group R may also comprise a heterocyclic group either for bonding directly to the hydroxyl group of ROH or separated therefrom by an alkylene group, e.g. of 1 to 4 carbon atoms such a methylene. Thus, group R may be a saturated or unsaturated heterocyclic or heterocyclic alkylene group. e.g. of 3 to 8 carbon atoms and at least one, e.g. one or two ring heteroatoms selected from O, N and S, especially O and/or N. Examples of such groups are furyl, tetrahydrofuryl, furfuryl and tetrahydrofurfuryl, pyranyl and tetrahydropyranyl. Most preferred R groups are tert-butyl, trityl, methoxymethyl, benzyloxymethyl and tetrahydropyranyl; stearyl, isopropyl, ethyl and methyl may also be preferred.

The preferred ester is t-butyl ester.

The ethylenically unsaturated ester may also be derived from a hydroxyl compound. e.g. of formula ROH, and an ethylenically unsaturated sulphonic or phosphoric acid which may, for example, contain 2 to 20 carbon atoms, especially 2 to 6 carbon atoms, such as alkenyl acids, e.g. vinyl sulphonic acid and vinyl phosphonic acid. Thus, the ester may be methyl or ethyl vinyl sulphonate or phosphonate. The ester may be derived from an acid containing an ethylenically unsaturated carboxamide (e.g. acrylamido) group.

It is advantageous also to include in the copolymer, in addition to monomers (i) and (ii) defined above, other monomers which impart high temperature stability. for example 2-acrylamido-2-methylpropane sulphonic acid.

The ester is copolymerised with an ethylenically unsaturated polar monomer to form the water-soluble copolymer. In the ethylenically unsaturated polar monomer, the unsaturated group is usually vinyl or alpha methyl vinyl, and may be derived from an unsaturated carboxylic acid (the acid being as further described above) e.g. as a primary, secondary or tertiary amide thereof, in which the amide is derived from ammonia, or a primary or secondary alkylamine, e.g. of 1 to 10 carbon atoms, which may optionally be substituted by at least one hydroxyl group as in alkylol amides such as ethanolamides. Examples of such carboxylic derived polar monomers are acrylamide, methacrylamide and acrylic ethanol amide. The polar monomer may also be a vinyl heterocyclic compound e.g. with at least O, S or N atom in a ring with 3 to 8 carbon atoms, such as one with at least one carbonyl group in the ring, e.g. N-vinyl-pyrrolidone or -caprolactam, or a vinyl pyridine.

In general, the copolymer will contain 0.01 to 50%, e.g. 0.1 to 40% or 1 to 30%, especially 5 to 15%, mol of structural units from said ester(s) and 99.99 to 50% e.g. 99.9 to 60% or 99 to 70% or 95 to 85%, mol of structural units from said polar monomer(s). The copolymer may be a block or non-block copolymer, e.g. a regular or random copolymer or a graft copolymer, especially with ester units grafted onto polymeric polar, monomer, e.g. ester grafted on polyacrylamide.

The copolymer will usually be soluble in water to an extent of at least 1 g/l e.g. 1 to 200 g/l such as at least 10 g/l in distilled water at 15° C. especially in aqueous sodium chloride solution containing 32 g/l NaCl at 25° C. If desired, the copolymer may be mixed with a sufactant (e.g. in amount of 0.01 to 5% by wt of the solution) to help solubilise it in the water or sodium chloride solution (e.g. brine).

The copolymer preferably has a weight average molecular weight of at least 50,000 e.g. 50,000 to 20 million, such as 100,000 to 10 million, especially 100,000 to 500,000 or 1 to 10 million. The molecular weight may be determined by conventional methods, e.g. gel permeation chromatography or intrinsic viscosity. The low molecular weight copolymer may, for example, have a viscosity in an aqueous 3.6% by weight solution at 19° C. of 10 to 500 cps (measured at 60 rpm with a Haake viscometer). Preferably the copolymer is sheer thinnable, e.g. with the viscosity reducing by at least 10% on increasing the sheer rate by 10%.

The copolymer may be made by conventional methods for copolymerising ethylenically unsaturated monomers in solution, emulsion or suspension, (preferably aqueous), such as are described in Encyclopaedia of Polymer Science & Engineering, Ed. Mark, Bikales. Overberger and Menges, Publ. Wiley Interscience, New York. 2nd ed. vol 1, pp 181–211 and references cited therein, especially L. J. Young in J. Brandrup and E. H. Immergut Eds, Polymer Handbook, J. Wiley, New York, 2nd Ed. 1975, Sec. II and 3rd Ed. Sec. III, especially pp 155/6 and references cited therein and R. Z. Greenley, J. Macromol Science Chem. 14, 427, 445 (1980) and G. Saini et al., Makromol. Chem. 144, 235 (1971). Reference should be made to these documents for further details. Free radical aqueous suspension and emulsion polymerisation is preferred.

The compositions of the invention comprise the copolymer and an organic compound capable of cross-linking an acrylic acid polymer in aqueous solution to form a gel. The cross-linking may be at 20–200° C. especially 40–150° C.

For downhole use, the composition of the invention contains water in which the copolymer and gelling agent may be dissolved. These aqueous compositions are usually made up just before use by mixing the copolymer and the gelling agent in an aqueous medium. e.g. sea water, and then injecting the aqueous composition into the formation. The composition is preferably kept at below 50° C. e.g. below 30° C. before use. The concentration of copolymer in the aqueous composition is preferably from 500 to 100,000 ppm, in particular 500 to 10,000 ppm for copolymers of molecular weight of at least 1 million, and from 10,000 to 100,000 ppm for copolymers of molecular weight 50,000 to 1 million. Preferably, the concentration of the gelling agent in the aqueous composition is from 10 to 50,000 ppm, especially 10 to 1,000 ppm and 1,000 to 50,000 ppm respectively, for the high and low molecular weight copolymers.

The aqueous compositions may be injected into a formation via a producing well or via a secondary injection well (for use with a water flood or squeeze technique), for example. The aqueous compositions may also contain other ingredients. e.g. antioxidants and/or oxygen scavengers. The injection may, if desired, be preceded by a precooling treatment, e.g. with cold water to stop premature cross-linking, but preferably the injection process is performed without such a pretreatment. The aqueous compositions may simply be injected into the formation but preferably they are forced into it by pumping. The formation will usually be about 50° to 180° C. especially 60° to 100° C. or 100° to 150° C. and will generally be water-bearing rather than oil-bearing. It may be of acidic rock, e.g. sandstone or neutral to basic rock, e.g. limestone. with associated formation water of e.g. pH 3 to 6.5 such as 4 to 6 or pH 6.5 to 8 respectively. The compositions of the invention are especially suitable for use with acidic and carbonate rocks, especially at about 60° C. to 150° C.

Compositions containing copolymers with carboxylic esters from tertiary alkanols or arylmethanols, or from ether substituted alkanols or heterocyclic alcohols may be used for example with acidic rocks at 80–120° C. and esters from other hydroxy compounds e.g. primary or secondary alkanols at 40–80° C. The well may be shut in for 1–70 hours, for example, to allow the gelling to occur, and then production may be restarted.

The compositions of the invention have the benefit of a low tendency to cross-linking and gelling in the wellbore (i.e. reduced aggregate build-up) but rapid cross-linking at the high temperatures of the formation. They are, therefore, less susceptible to process handling problems, without the environmental and other problems associated with the use of metal cross-linking agents.

The invention is illustrated in the accompanying figueres which show graphical plots of viscosity against time for a series of compositions. The copolymers and cross-linking agent were placed in a Brookfield DV111 Rheometer with external heating bath and the viscosity and time measured.

| FIG. NO. | Copolymer | Cross-linker conc. | Temperature |
|---|---|---|---|
| 1 | PA/PA t-butyl ester | 5000 ppm | 90° C. |
| 2 | PA/MA | 5000 ppm | 90° C. |
| 3 | Partially hydrolysed PA | 1% | 90° C. |
| 4 | <0.1% hydrolysed PA | 5000 ppm | 90° C. |

PA means polyacrylamide, MA means methyl acrylate, the cross-linker used was polyethyleneimine of average molecular weight 70,000, the concentration is the concentration based on wt/wt. Copolymer 1 is a copolymer of polyacrylamide (95%) and tertiary butyl acrylate (5%). Copolymer 2 is a copolymer of polyacrylamide (95%) and methyl acrylate (5%). The partially hydrolysed PA corresponds to a copolymer of acrylic acid and acrylamide.

Copolymers 1 and 2 are according to the invention, but copolymers 3 and 4 are not according to the invention and are given for comparison only. As can be seen, with the copolymer compositions of the invention, there is gelling at the appropriate rate for use as a blocking agent in oil well conformance.

In order that the invention may be more fully understood, the following Examples are given by way of illustration only.

EXAMPLE 1

A 5 ft (1.52 m) stainless steel tube of internal diameter ¼ inch (0.635 cm) was packed with quartz sand of average particle size 90 $\mu$m–150 $\mu$m. Sea water (3.2% total dissolved solids) was pumped into the tube at 40° C. until a constant differential pressure was obtained. The absolute permeability of the sand pack was calculated by means of Darcy's Law to be 1286 milli Darcies. The tube was then flooded with Forties Crude Oil containing 15% volume toluene followed by another flush of sea water to constant differential pressure. The permeability of the sand pack at residual oil saturation was calculated to be 436 milli Darcies.

A seawater solution containing 10% by weight of a 95:5 copolymer of acrylamide and tertiary butyl acrylate and 4% polyethyleneimine was pumped into the tube (maintained at 40° C. by means of an oven) at a flow rate of 1.5 ml/hr and in such a way as to maintain a retention time of ½ hour in the inlet tube at 40° C. prior to entry into the sand pack. The maximum pressure limit was set at 100 bar ($10^7$ Pa) and this limit was reached after 12 hours of flow after which virtually no further flow took place.

In order to ascertain the depth of the gel block the tube was placed under reverse flow while maintaining a differential pressure of 100 bar ($10^7$ Pa). During this operation 6 inch (15.24 cm) sections of tube were cut from the outlet end (previously the inlet end) until the flow could be detected. The tube was found to be blocked to at least 4 ft 6 ins (1.37 m) which represented 95% of total volume pumped.

EXAMPLE 2

In an analogous fashion to Example 1, a 5 ft (1.52 m) tube was found to have an absolute permeability of 1623 mD and a permeability of 463 mD at residual oil saturation. A seawater solution containing 10% by weight of the copolymer and 2.5% by weight of polyethyleneimine was pumped at a rate of 1–5 mls/hr and a temperature of 70° C. to give a total blocking time of 4 hrs.

EXAMPLE 3

In an analogous fashion to Example 1, a 5 ft (1.52 m) tube was found to have an absolute permeability of 198 mD and a permeability of 62 mD at residual oil saturation (by employing sand of finer grain size). A seawater solution containing 10% by weight of the copolymer and 0.4% by weight of polyethyleneimine was pumped at a rate of 3 mls/hr and a temperature of 110° C. to give a total blocking time of 5.5 hrs.

What is claimed is:

1. A composition for use in a subterranean formation, which composition comprises a water-soluble copolymer comprising
   (i) at least one non-acidic ethylenically unsaturated polar monomer; and
   (ii) at least one coplymerisable ethylenically unsaturated ester;
and at least one organic gelling agent, characterized in that the organic gelling agent is a polyalkyleneimine, a poly-functional aliphatic amine, an aralkylamine or a heteroaralkylamine.

2. A composition according to claim 1, wherein the poly-functional aliphatic amine is a polyalkylenepolyamine.

3. A composition according to claim 2, wherein the polyalkylenepolyamine is a polyethylene- or polypropylenepolyamine.

4. A composition according to claim 1, wherein the polyakyleneimine is a polymerised ethyleneimine or propyleneimine.

5. A composition according to claim 1, wherein the said heteroaralkylamine contains at least one heteroatom.

6. A composition according to any of claims 1 to 5, wherein the copolymer comprises from one to three polar monomers (i) and from 1 to 3 unsaturated esters (ii).

7. A composition according to any of claims 1 to 5, wherein the ester is formed from a hydroxyl compound and an ethylenically unsaturated carboxylic acid selected from acrylic, methacrylic, crotonic and cinnamic acids.

8. A composition according to claim 7, wherein the hydroxyl compound is an alcohol of formula ROH where R is a C1–30 alkyl, alkenyl, cycloalkyl, aryl or aralkyl group, is a hydroxyl, ether or thio ether substituted hydrocarbyl group.

9. A composition according to any of claims 1 to 5, wherein the ethylenically unsaturated ester is an alkyl or aralkyl acrylate in which the alkyl group is a C1 to 10 alkyl group and the aralkyl group is a C1 to 5 alkyl substituted aryl group.

10. A composition according to any of claims 1 to 5, wherein the ethylenically unsaturated polar monomer is an amide of an unsaturated carboxylic acid.

11. A composition according to claim 10, wherein the ethylenically unsaturated polar monomer is acrylamide.

12. A composition according to any of claims 1 to 5, wherein the copolymer contains from 5–15% mol of structural units from said ester and 95–85% mol of structural units from said polar monomer.

13. A composition according to any of claims 1 to 5, wherein the copolymer is a regular or random copolymer or a graft copolymer.

14. A composition according to claim 13, wherein the coploymer is a graft copolymer in which ester units are grafted onto a polyacrylamide.

15. A composition according to any of claims 1 to 5, wherein the copolymer is soluble in water to an extent of at least 10 g/l.

16. A composition according to any of claims 1 to 5, wherein the copolymer has a weight average molecular weight of at least 50,000.

17. A composition according to claim 16, wherein the copolymer has a weight average molecular weight of 1–10 million.

18. A composition according to any of claims 1 to 5, wherein the copolymer and the gelling agent are in aqueous solution.

19. A method of conformance control of a subterranean reservoir, which comprises:
   (a) injecting into a formation an aqueous solution of a composition as claimed in any of claims 1 to 5;
   (b) allowing the solution to flow through at least one permeable zone in said formation;
   (c) allowing the composition to gel.

* * * * *